United States Patent
Fujino et al.

(10) Patent No.: US 7,754,381 B2
(45) Date of Patent: Jul. 13, 2010

(54) ANODE AND BATTERY, AND MANUFACTURING METHODS THEREOF

(75) Inventors: Takemasa Fujino, Gunma (JP); Takatomo Nishino, Fukushima (JP); Yoshiaki Takeuchi, Fukushima (JP)

(73) Assignee: Sony Corporation, Tokyo (JP)

( * ) Notice: Subject to any disclaimer, the term of this patent is extended or adjusted under 35 U.S.C. 154(b) by 1022 days.

(21) Appl. No.: 10/531,248

(22) PCT Filed: Oct. 6, 2003

(86) PCT No.: PCT/JP03/12780

§ 371 (c)(1),
(2), (4) Date: Apr. 14, 2005

(87) PCT Pub. No.: WO2004/038835

PCT Pub. Date: May 6, 2004

(65) Prior Publication Data

US 2006/0099505 A1    May 11, 2006

(30) Foreign Application Priority Data

Oct. 25, 2002 (JP) ............................ 2002-311269

(51) Int. Cl.
*H01M 4/62* (2006.01)
*H01M 4/02* (2006.01)

(52) U.S. Cl. ............ 429/217; 429/209; 29/623.5; 252/182.1

(58) Field of Classification Search ............ 429/217; 29/623.5; 252/182.1
See application file for complete search history.

(56) References Cited

U.S. PATENT DOCUMENTS

2004/0043294 A1 * 3/2004 Fukui et al. ............ 429/235

FOREIGN PATENT DOCUMENTS

| JP | 06-325765 | | 11/1994 |
|---|---|---|---|
| JP | 07-230800 | | 8/1995 |
| JP | 07-288130 | | 10/1995 |
| JP | 08-195201 | * | 7/1996 |
| JP | 08-315825 | | 11/1996 |
| JP | 09-320607 | | 12/1997 |
| JP | 10-241737 | | 9/1998 |
| JP | 11-102705 | | 4/1999 |
| JP | 2000-012018 | | 1/2000 |
| JP | 2000-012092 | | 1/2000 |
| JP | 2000-036323 | * | 2/2000 |
| JP | 2002-033106 | | 1/2002 |

* cited by examiner

*Primary Examiner*—Dah-Wei Yuan
*Assistant Examiner*—Angela J. Martin
(74) *Attorney, Agent, or Firm*—K&L Gates LLP

(57) ABSTRACT

An anode and a battery capable of realizing a high capacity and improving charge and discharge cycle characteristics, and manufacturing methods thereof are provided. An anode active material layer contains a particulate anode active material including a simple substance or a compound of an element capable of forming an alloy with Li, a particulate binder including a copolymer of vinylidene fluoride or polyvinylidene fluoride, and a conductive agent. The anode active material layer is formed by using a dispersion medium having a swelling degree of 10% or less to the binder, specifically pure water or the like. The particulate binder functions as a cushion to absorb expansion and shrinkage of the anode active material due to charge and discharge, and lowering of electron conductivity caused by generation of cracks or separation is prevented. Further, since the anode active material is not covered with the binder, electrode reaction is well performed.

9 Claims, 8 Drawing Sheets

ANODE AND BATTERY, AND MANUFACTURING METHODS THEREOF

CROSS REFERENCE TO RELATED APPLICATION

The present application claims priority to Japanese Patent Document No. P2002-311269 filed on Oct. 25, 2002, the disclosure of which is herein incorporated by reference.

BACKGROUND OF THE INVENTION

The present invention relates to an anode including a particulate anode active material and a binder and a battery using it, and manufacturing methods thereof.

A secondary battery is utilized as a portable power source for various portable electronic devices or portable communication equipment such as a combination camera and a laptop computer. In recent years, downsizing, weight saving, and high performance of these portable electronic devices and portable communication equipment have been made significantly. Along with these situations, improvement of characteristics of the secondary battery has been strongly aspired. Specially, a lithium ion secondary battery has attracted attention, since the lithium ion secondary battery can provide a larger energy density compared to a lead battery or a nickel-cadmium battery, which is a conventional aqueous solution-type electrolytic solution secondary battery.

Conventionally, in this lithium ion secondary battery, as an anode material, carbonaceous materials such as non-graphitizable carbon and graphite showing a comparatively high capacity and realizing good charge and discharge cycle characteristics have been widely used. However, along with recent trend of high capacity, acquiring even higher capacity of the anode has been aspired, and the research and development thereof has been promoted.

To cite a case, for example, a technique, in which a high capacity is attained by an anode using a carbonaceous material by selecting a carbonized raw material and fabrication conditions has been reported (for example, refer to Japanese Unexamined Patent Application Publication No. H08-315825). However, when this anode is used, a discharge potential is 0.8 V to 1.0 V in relation to lithium. Therefore, a battery discharge voltage when the battery is constructed becomes low, and therefore, major improvement with respect to a battery energy density cannot be expected. Further, there are shortcomings that hysteresis is large in a charge and discharge curve shape, and energy efficiency in each charge and discharge cycle is low.

Further, as an anode material capable of realizing a higher capacity, for example, a material applying a fact that a certain kind of a lithium metal is reversibly generated and decomposed by an electrochemical reaction has been widely researched. Specifically, Li—Al alloy has been widely known from long time ago, and silicon alloy is also reported (for example, refer to U.S. Pat. No. 4,950,566). However, there are problems that the anode materials of these alloys and the like are highly expanded and shrunk due to charge and discharge, cracks or separation is generated in the electrode, pulverization phenomenon is generated, and charge and discharge cycle characteristics thereof are poor.

Therefore, in order to improve charge and discharge cycle characteristics, anode materials to which an element not involved in the expansion and shrinkage due to insertion and extraction of lithium is added have been reported. As such an anode material, for example, $Li_xSiO_w$ ($v \geq 0$, $2 > w > 0$) (refer to Japanese Unexamined Patent Application Publication No. H06-325765), $Li_xSi_{1-y}M_yO_z$ (M is a metal except for alkali metals or a metalloid except for silicon, $x \geq 0$, $1 > y > 0$, $0 < z < 2$) (refer to Japanese Unexamined Patent Application Publication No. H07-230800), Li—Ag—Te alloy (refer to Japanese Unexamined Patent Application Publication No. H07-288130), and a compound including an element of Group 4B except for carbon and one or more nonmetallic elements (refer to Japanese Unexamined Patent Application Publication No. H11-102705) can be cited.

However, even when these anode materials are used, there are problems that as charge and discharge cycles are repeated, cracks or separation is generated in the electrode due to expansion and shrinkage of the material, electron conduction of the electrode lacks, and charge and discharge cycle characteristics are largely deteriorated. Therefore, even when a new high-capacity anode material is used, the characteristics thereof cannot be sufficiently demonstrated.

SUMMARY OF THE INVENTION

The present invention provides in an embodiment anode and a battery capable of realizing a high capacity and improving charge and discharge characteristics, and manufacturing methods thereof.

An anode according to the invention is an anode, including: a particulate anode active material; and a particulate binder containing at least one from the group consisting of copolymers including vinylidene fluoride and polyvinylidene fluoride.

A battery according to the invention is a battery, comprising: a cathode; an anode; and an electrolyte, wherein the anode includes: a particulate anode active material; and a particulate binder containing at least one from the group consisting of copolymers including vinylidene fluoride and polyvinylidene fluoride.

A method of manufacturing an anode according to the invention is a method of manufacturing an anode, wherein the anode is formed by using an anode mixture slurry including: a particulate anode active material; a particulate binder containing at least one from the group consisting of copolymers including vinylidene fluoride and polyvinylidene fluoride; and a dispersion medium having a swelling degree of 10% or less to the binder.

A method of manufacturing a battery according to the invention is a method of manufacturing a battery, comprising: a cathode; an anode; and an electrolyte, wherein the anode is formed by using an anode mixture slurry including: a particulate anode active material; a particulate binder containing at least one from the group consisting of copolymers including vinylidene fluoride and polyvinylidene fluoride; and a dispersion medium having a swelling degree of 10% or less to the binder.

In the anode and the battery according to the invention, the particulate binder presents so-called cushion characteristics. Therefore, expansion and shrinkage of the anode active material due to charge and discharge are absorbed, and lowering electron conductivity of the anode caused by cracks or separation is prevented. Further, since the anode active material is not covered with the binder, electrode reaction is not inhibited by the binder. Thereby, charge and discharge cycle characteristics are improved.

In the method of manufacturing an anode and the method of manufacturing a battery according to the invention, the dispersion medium having a swelling degree of 10% or less to the binder is used. Therefore, the binder is not dissolved in the dispersion medium, and the particle-like binder or the binder particles exist in a state of being fused by heating. Therefore, the anode and the battery of the invention can be easily obtained.

Additional features and advantages of the present invention are described in, and will be apparent from, the following Detailed Description of the Invention and the figures.

DETAILED DESCRIPTION OF THE INVENTION

The present invention relates to an anode including a particulate anode active material and a binder and a battery using it, and manufacturing methods thereof.

An embodiment of the invention will be hereinafter described in detail with reference to the drawings.

Figure 1:
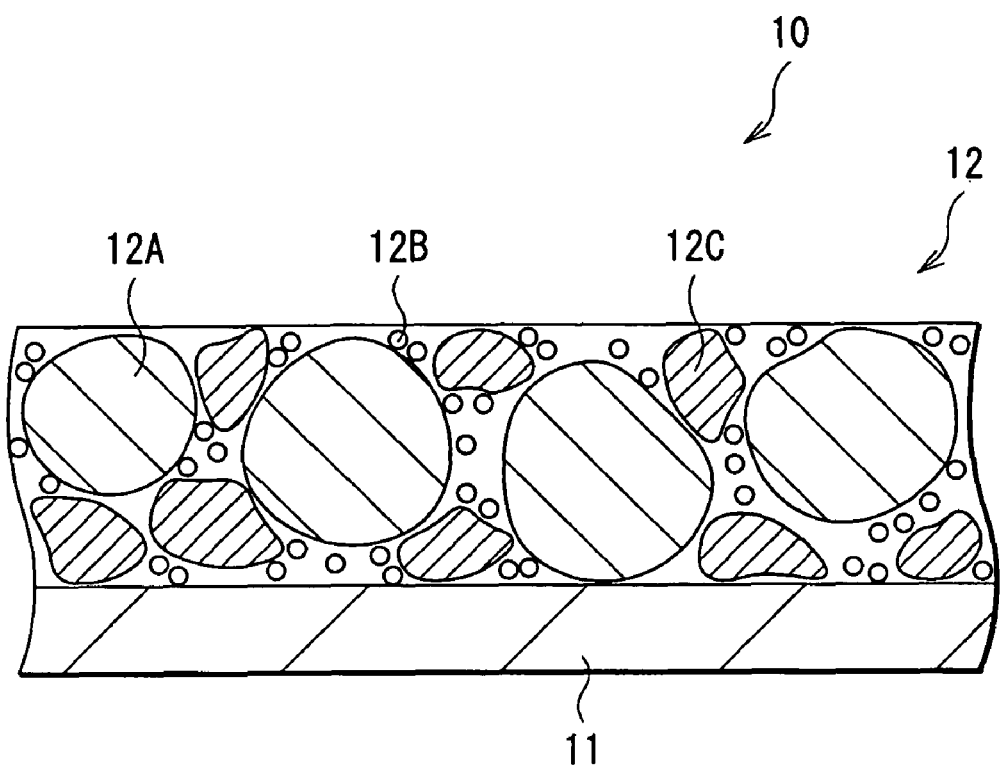
FIG. 1 is a cross section showing a construction of an anode according to an embodiment of the invention.

FIG. 1 is a view showing a model of a construction of an anode 10 according to the embodiment of the invention. The anode 10 has, for example, an anode current collector 11 having a pair of opposed faces and an anode active material layer 12 provided on one face of the anode current collector 11. Though not shown, it is possible to provide the anode active material layer 12 on both faces of the anode current collector 11.

The anode current collector 11 preferably has good electrochemical stability, electric conduction, and a mechanical strength. The anode current collector 11 is made of a metal material such as copper (Cu), nickel (Ni), and stainless. In particular, copper is preferable since copper has high electric conductivity.

The anode active material layer 12 includes a particulate anode active material 12A, a particulate binder 12B, and if necessary, a conductive agent 12C. As described later in the manufacturing method thereof, the anode active material layer 12 is formed by, for example, mixing the anode active material 12A, the binder 12B, and the conductive agent 12C by using a dispersion medium having a swelling degree of 10% or less to the binder 12B.

Figure 2:
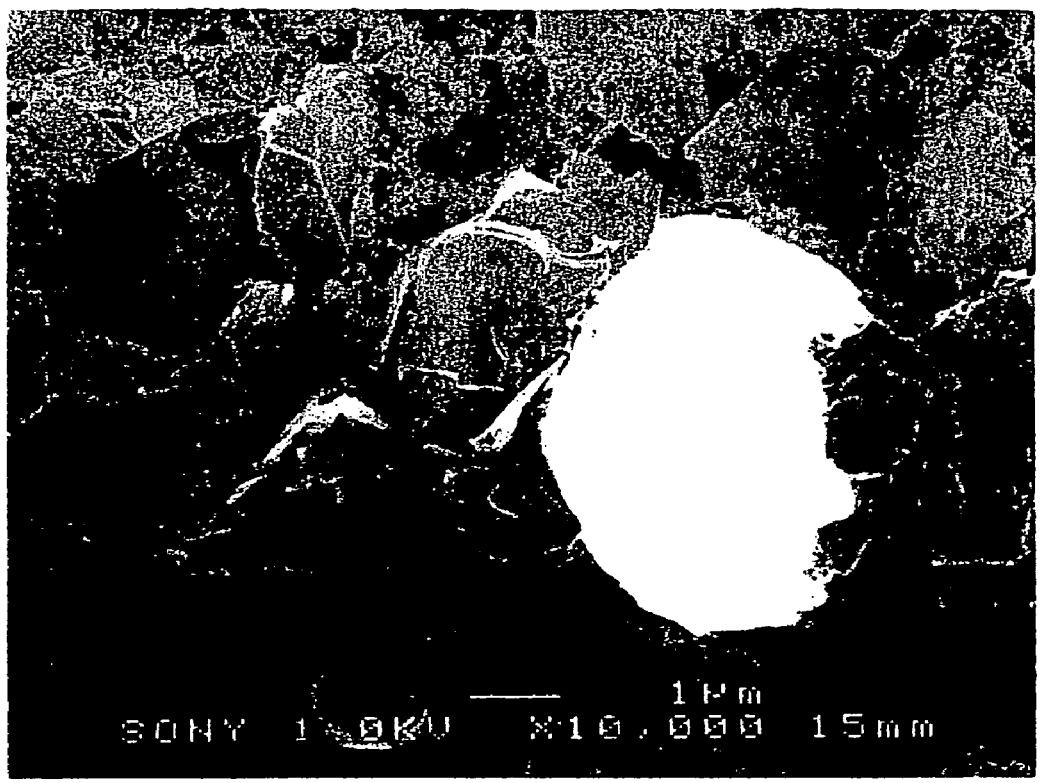
FIG. 2 is a micrograph showing a particle structure of an anode active material layer of the anode shown in FIG. 1.
Figure 3:
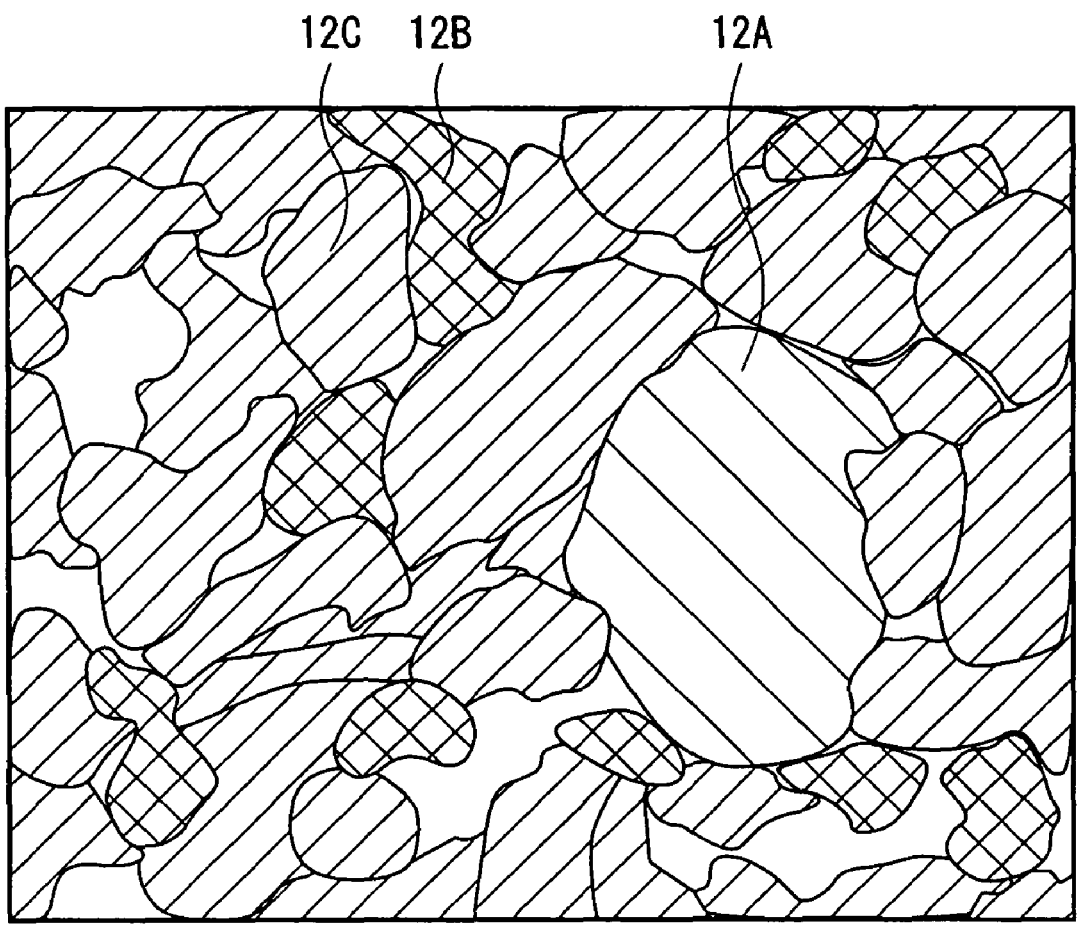
FIG. 3 is an explanation drawing separately showing the particle structure shown in FIG. 2 by hatching.
Figure 4:
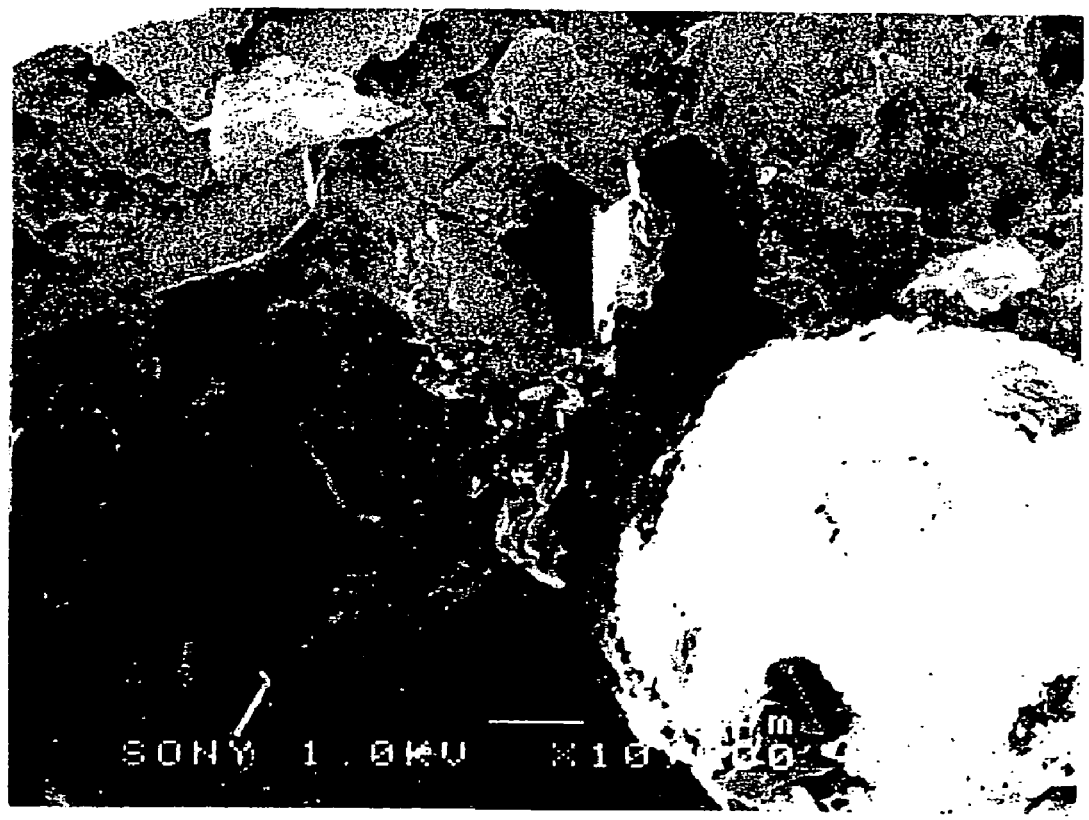
FIG. 4 is a micrograph showing a particle structure of a conventional anode active material layer.
Figure 5:
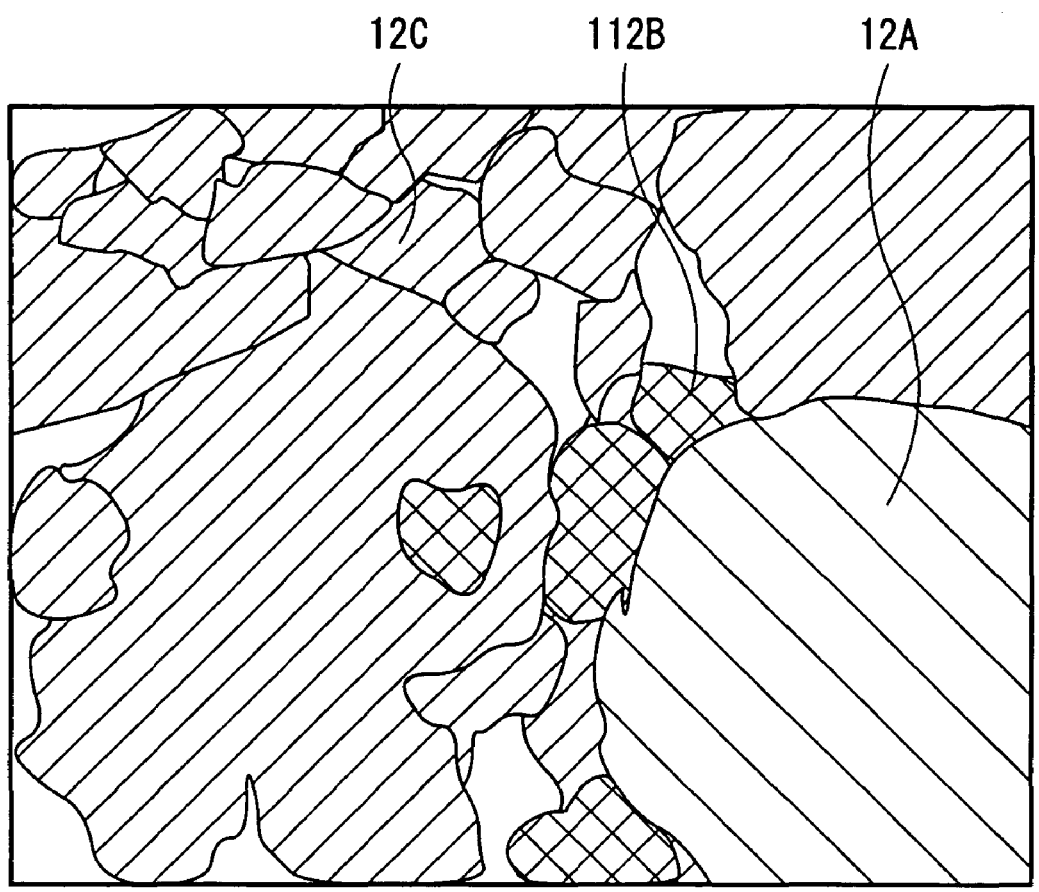
FIG. 5 is an explanation drawing separately showing the particle structure shown in FIG. 4 by hatching.

In FIG. 2, a micrograph of the anode active material layer 12 is shown. In FIG. 3, a particle structure of FIG. 2 is shown separately by hatching. In FIG. 4, a micrograph of a conventional anode active material layer is shown. In FIG. 5, a particle structure of FIG. 4 is shown separately by hatching. The conventional anode active material layer shown in FIG. 4 is formed by mixing the anode active material 12A, the binder 112B, and the conductive agent 12C by using a dispersion medium, in which the binder 112B is dissolved.

As evidenced by FIGS. 2 to 5, in the anode active material layer 12 according to this embodiment, the binder 12B is particulate. Meanwhile, in the conventional anode active material layer 12, the binder 112B is linear or scarious due to dissolution and deposition, and surfaces of the anode active material 12A and the conductive agent 12C are covered with the binder 112B. Thereby, in this embodiment, the particulate binder 12B functions as a cushion to absorb expansion and shrinkage of the anode active material 12A due to charge and discharge. In addition, differently from the conventional fragile binding due to dissolution and deposition, in this embodiment, solid binding by the thermally adhered binder 12B can be realized. Further, the anode active material 12A and the conductive agent 12C are prevented from being covered with the binder 12B.

As the anode active material 12A, for example, a material including at least one of the simple substances of elements capable of forming an alloy with a light metal such as lithium (Li) and compounds thereof is preferable. Such a material has a high ability to insert and extract the light metal such as lithium, contributing to obtaining a high capacity. In this specification, the alloy includes an alloy consisting of one or more metal elements and one or more metalloid elements, in addition to an alloy consisting of two or more metal elements. Examples of the structure thereof include a solid solution, an eutectic crystal (eutectic mixture), an intermetallic compound, and a structure, in which two or more thereof coexist.

The anode active material 12A can be used singly, or two or more thereof can be used by mixing. For example, as an element capable of forming an alloy with lithium, magnesium (Mg), boron (B), aluminum (Al), gallium (Ga), indium (In), silicon (Si), germanium (Ge), tin (Sn), lead (Pb), antimony (Sb), bismuth (Bi), cadmium (Cd), silver (Ag), zinc (Zn), hafnium (Hf), zirconium (Zr), and yttrium (Y) can be cited. Specially, elements of Group 14 except for carbon (C) in the long period periodic table, that is, silicon, germanium, tin, and lead are preferable, and specially silicon and tin are more preferable. Silicon and tin have a high ability to insert and extract lithium.

As a compound thereof, for example, a compound expressed by a chemical formula of $M1_a M2_b Li_c$ is utilized. In this chemical formula, M1 represents at least one of the elements capable of forming an alloy with lithium, M2 represents at least one of the elements other than M1 and lithium. Values of a, b, and c are expressed as $a>0$, $b \geqq 0$, and $c \geqq 0$, respectively. Specifically, for example, Li—Al, Li—Al-M3 (M3 is at least one of the elements of Groups 2, 13, and 14 in the long period periodic table), Al—Sb, Cu—Mg—Sb, M4Si (M4 is at least one of the elements other than silicon), and M5Sn (M5 is at least one of the elements other than tin) can be utilized.

Such an anode active material 12A is, for example, fabricated by mechanical alloying method, atomization method such as liquid atomization method and gas atomization method, roll quenching method such as single roll method and double roll method, or rotating electrode method. To have such an anode active material 12A include lithium, it is possible that a battery is fabricated and then lithium is inserted electrochemically inside the battery. Otherwise, it is possible that before or after fabricating a battery, lithium is supplied from a cathode or a lithium supply source other than the cathode, and lithium is inserted electrochemically. Otherwise, it is possible that the anode active material 12A is fabricated as a lithium-containing material in material composition.

The binder 12B includes, for example, copolymers including vinylidene fluoride and polyvinylidene fluoride and combinations thereof. Specific examples of the copolymer include vinylidene fluoride-hexafluoropropylene copolymer, vinylidene fluoride-chlorotrifluoroethylene copolymer, and a copolymer, in which other ethylene unsaturated monomer is further polymerized with any of these copolymers. As a polymerizable ethylene unsaturated monomer, acrylic ester, methacrylic acid ester, vinyl acetate, acrylonitrile, acrylic acid, methacrylic acid, mallein anhydride, butadiene, styrene, N-vinyl pyrrolidone, N-vinyl pyridine, glycidyl methacrylate, hydroxyethyl methacrylate, methyl vinyl ether and the like can be cited, but examples are not limited thereto.

An average particle diameter of the binder 12B is preferably 30 μm or less, and is more preferably 1 μm or less. When the average particle diameter becomes large, uniform dispersion becomes difficult, and fabrication of the electrode becomes difficult. Here, the average particle diameter means a median size of a primary particle, and is measured by a laser diffraction type particle size distribution measuring device. As described later in the manufacturing method thereof, it is preferable that the binder 12B is fused by heating, since the binding force can be thereby improved.

The conductive agent 12C serves to secure electron conductivity between inside of the anode active material layer 12, the anode active material layer 12 and the anode current collector 11, even when the anode active material 12A is expanded and shrunk due to charge and discharge.

As the conductive agent 12C, for example, natural graphites such as a scaly graphite, squamation graphite, and earthy graphite; artificial graphites such as petroleum coke, coal coke, mesophase pitch, substances obtained by firing polyacrylonitrile (PAN), rayon, polyamide, lignin, polyvinyl alcohol or the like at high temperatures, and vapor-phase growth carbon fiber; carbon blacks such as acetylene black, furnace black, ketjen black, channel black, lamp black, and thermal black; carbon materials such as asphalt pitch, coal tar, activated carbon, and mesophase pitch; polyacene organic semiconductor; metal powders or metal fibers made of copper, nickel, aluminum, silver or the like; conductive whiskers made of zinc oxide, potassium titanate or the like; and conductive metal oxides such as titanium oxide can be cited. Specially, the graphites represented by the natural graphite or the artificial graphite, or the carbon blacks are preferable. The conductive agent 12C can be used singly, or two or more thereof can be used by mixing.

For example, the anode 10 can be manufactured as follows.

First, the particulate anode active material 12A, the particulate binder 12B, and if necessary, the particulate conductive agent 12C are dispersed in a dispersion medium having a swelling degree of 10% or less to the binder 12B to obtain an anode mixture slurry. The swelling degree of the dispersion medium to the binder 12B is obtained by a volume change ratio of the binder 12B after the binder 12B is immersed in the dispersion medium for 72 hours, that is, a ratio of the volume increased by the immersion. When solubility of the binder 12B in relation to the dispersion medium is low, the binder 12B is first swollen and then is dissolved. Therefore, the swelling degree of 10% or less means that the binder 12B is not dissolved in the dispersion medium. Thereby, the binder 12B remains particulate without being dissolved.

The dispersion medium varies according to the binder 12B to be used. For example, water, toluene, xylene, methanol, ethanol, n-propanol, isopropyl alcohol, isobutyl alcohol, acetone, methyl ethyl ketone, methyl isobutyl ketone, cyclohexanone, acetic ether, butyl acetate, tetrahydrofuran, and dioxane can be cited. Specially, water, ethanol, and methyl isobutyl ketone are suitable. The dispersion medium can be used singly, or two or more thereof can be used by mixing as long as the swelling degree for the binder 12B is 10% or less.

An average particle diameter of the binder 12B used for the anode mixture slurry is preferably 30 μm or less, and is more preferably 1 μm or less. As described above, when the average particle diameter is large, uniform dispersion becomes difficult, and forming the electrode also becomes difficult.

It is possible to add a thickening agent or a dispersion aid to the anode mixture slurry if necessary. As a thickening agent, for example, starch; carboxymethyl cellulose; ammonium salt, sodium salt, or potassium salt of carboxymethyl cellulose; hydroxypropyl cellulose; regenerated cellulose; and diacetyl cellulose can be cited. The thickening agent can be used singly, or two or more thereof can be used by mixing.

As a dispersion aid, for example, fatty acids such as caproic acid, caprylic acid, lauric acid, myristic acid, palmitic acid, stearic acid, behenic acid, oleic acid, elaidic acid, linoleic acid, linolenic acid, and stearoyl acid; a metal soap consisting of such a fatty acid and an alkali metal (Li, Na, K or the like) or an alkali earth metal (Mg, Ca, Ba or the like); fatty amine; coupling agents such as silane coupling agent and titanium coupling agent; compounds such as higher alcohol, polyalkylene oxide phosphate ester, alkyl phosphate ester, alkyl boronic acid ester, sarcocinates, polyalkylene oxide esters, and lecithin; nonionic surface active agents of alkylene oxides or glycerins; cationic surface active agents such as higher alkylamines, quaternary ammonium salts, phosphonium, and sulfonium; anionic surface active agents such as carboxylic acid, sulfonic acid, phosphoric acid, sulfuric ester, and phosphoric ester; ampholytic surface active agents such as amino acid, amino sulfonic acid, sulfuric ester or phosphoric ester of amino alcohol; and water-soluble polymers such as carboxymethyl cellulose, hydroxyethyl cellulose, hydroxypropyl cellulose, polyacrylic acid, polyvinyl alcohol and modified bodies thereof, polyacrylamide, polyhydroxy (meta)acrylate, and styrene-maleic acid copolymer can be cited. The dispersion aid can be used singly, or two or more thereof can be used by mixing.

When the anode mixture slurry is prepared, it is possible that the anode active material 12A, the binder 12B, and if necessary, the conductive agent 12C are simultaneously added to the dispersion medium and dispersed therein, or otherwise it is possible that after the binder 12B is dispersed in the dispersion medium, the anode active material 12A and if necessary, the conductive agent 12C or the like are added and dispersed. However, it is preferable that the binder 12B in a state of dispersion condition called dispersion or emulsion, in which the binder 12B is dispersed in the dispersion medium together with the dispersion aid is mixed with the anode active material 12A and if necessary, the conductive agent 12C or the like. By improving dispersion characteristics of the binder 12B, higher effects can be obtained.

For mixing, kneading, and dispersing into the dispersion medium of the anode active material 12A, the binder 12B, and the conductive agent 12C or the like, any mixing stirrer such as known kneader, mixer, homogenizer, dissolver, planetary mixer, paint shaker, and sand mill can be used.

Next, the anode current collector is uniformly coated with the anode mixture slurry by doctor blade method or the like, and a coating layer is formed. Subsequently, the coating layer is dried at high temperatures to remove the dispersion medium. After that, the resultant is pressed by a roll pressing machine or the like to obtain a high density. Then, it is preferable that pressurization is performed at temperatures equal to or more than the melting point of the binder 12B to fuse the binder 12B. Otherwise, it is preferable that in addition to the pressure step, the binder 12B is heated at temperatures equal to or more than the melting point of the binder 12B to fuse the binder 12B. Thereby, the binding force can be improved. Fusing the binder 12B can be performed before or after the pressure step. Further, fusing the binder 12B can be performed in the vacuum atmosphere, the argon atmosphere, the nitrogen atmosphere, the oxygen atmosphere, or the mixed atmosphere thereof. Thereby, the anode 10 shown in FIG. 1 can be obtained.

This anode 10 is, for example, used for a battery as follows.

Figure 6:
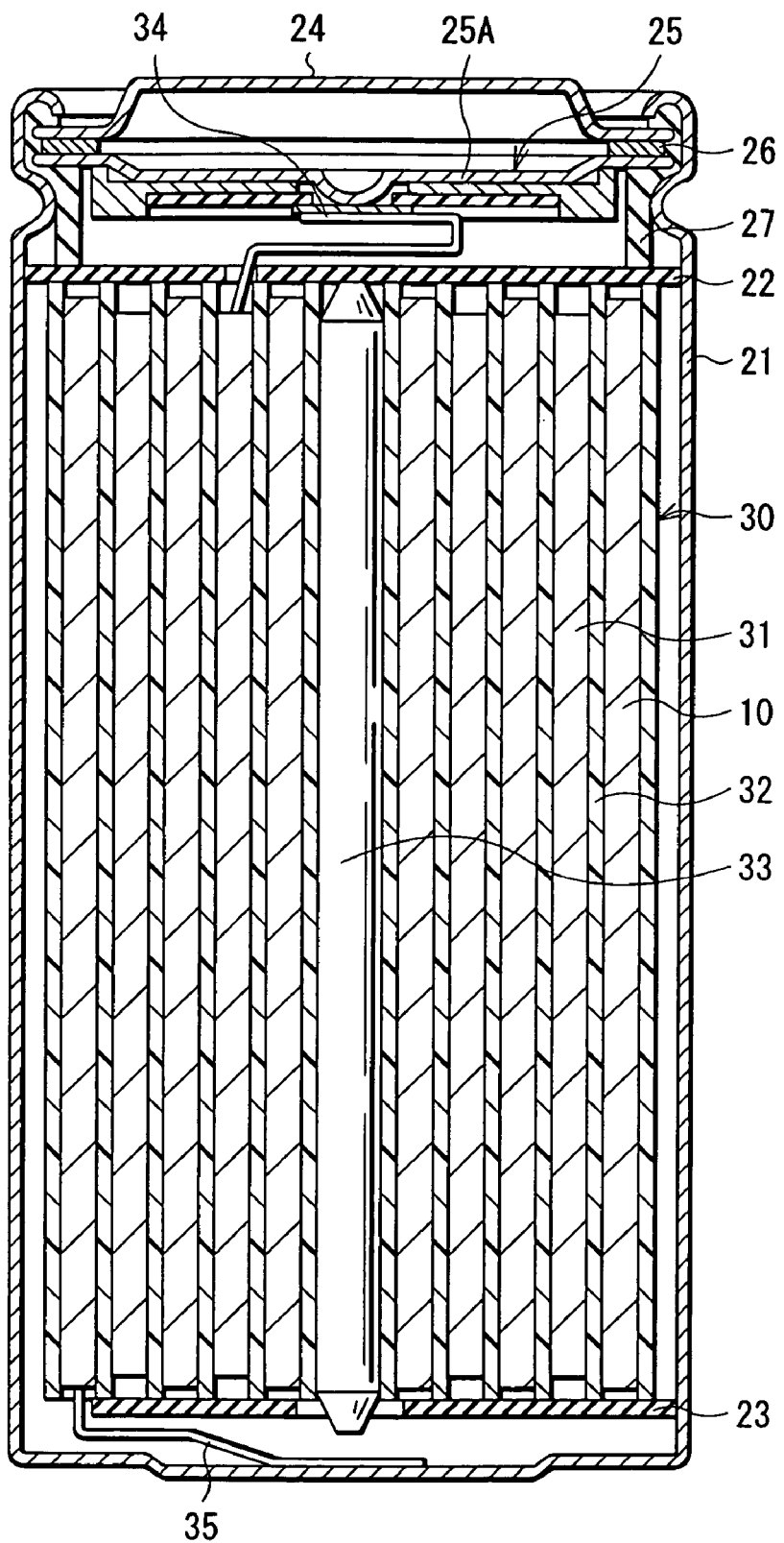
FIG. 6 is a cross section showing a construction of a secondary battery using the anode shown in FIG. 1.

FIG. 6 shows a cross section structure of a secondary battery using the anode 10 according to this embodiment. This secondary battery is a so-called cylinder type battery, and has a winding electrode body 30 inside a battery can 21 in the shape of an approximately hollow cylinder. The battery can 21 is made of, for example, iron (Fe) plated by nickel. One end of the battery can 21 is closed, and the other end of the battery can 21 is opened. Inside the battery can 21, a pair of insulating plates 22 and 23 are respectively arranged perpendicular to the winding periphery so that the winding electrode body 30 is sandwiched between the pair of insulating plates 22 and 23.

At the open end of the battery can 21, a battery cover 24, and a safety valve mechanism 25 and a Positive Temperature Coefficient device (PTC device) 26 provided inside this battery cover 24 are mounted by being caulked through a gasket 27. Inside of the battery can 21 is closed. The battery cover 24 is, for example, made of a material similar to that of the battery can 21. The safety valve mechanism 25 is electrically connected to the battery cover 24 through the PTC device 26. When an inner pressure of the battery becomes a certain level or more by inner short circuit or heating from outside, a disk plate 25A flips to cut the electrical connection between the battery cover 24 and the winding electrode body 30. When a temperature is raised, the PTC device 26 limits a current by increasing its resistance value to prevent abnormal heat generation by a large current. The PTC device 26 is, for example, made of barium titanate semiconductor ceramics. The gasket 27 is made of, for example, an insulating material and its surface is coated with asphalt.

In the winding electrode body 30, for example, a cathode 31 and the anode 10 according to this embodiment are wound with a separator 32 inbetween, and a center pin 33 is inserted in the center thereof. A cathode lead 34 made of aluminum or the like is connected to the cathode 31, and an anode lead 35 made of nickel or the like is connected to the anode 10. The cathode lead 34 is electrically connected to the battery cover 24 by being welded to the safety valve mechanism 25. The anode lead 35 is welded and electrically connected to the battery can 21.

Figure 7:
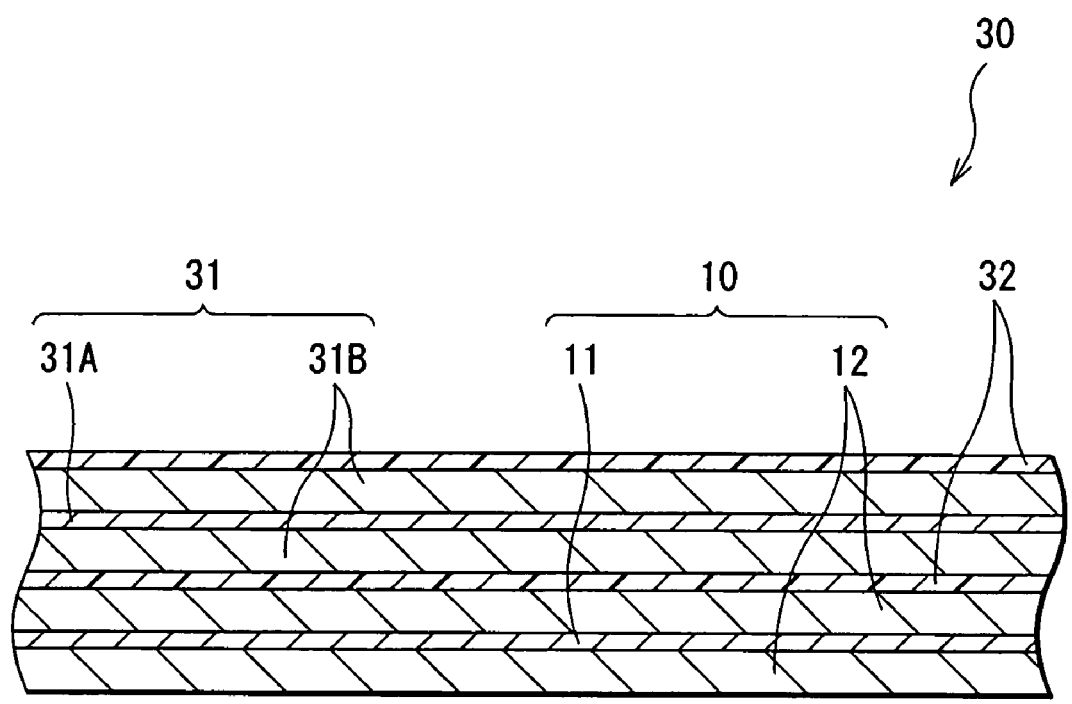
FIG. 7 is a cross section showing a partly enlarged winding electrode body in the secondary battery shown in FIG. 6.

FIG. 7 shows an enlarged part of the winding electrode body 30 shown in FIG. 6. The anode 10 has, for example, a structure, in which the anode active material layer 12 is provided on one face or both faces of the anode current collector 11. The constructions of the anode current collector 11 and the anode active material layer 12 are as mentioned above. In this secondary battery, the anode active material layer 12 contains at least one of the simple substances of elements capable of forming an alloy with lithium and the compounds thereof as the anode active material 12A.

The cathode 31 has, for example, a structure, in which a cathode active material layer 31B is provided on one face or both faces of a cathode current collector 31A having a pair of opposed faces. The cathode current collector 31A is made of, for example, a metal foil such as an aluminum foil, a nickel foil, and a stainless foil. The cathode active material layer 31B includes, for example, a cathode material capable of inserting and extracting lithium as a cathode active material. The cathode active material layer 31B can also include, if necessary, a conductive agent such as artificial graphite and carbon black and a binder such as polyvinylidene fluoride.

As a cathode material capable of inserting and extracting lithium, metal sulfides or oxides which do not contain lithium such as $TiS_2$, $MoS_2$, $NbSe_2$, and $V_2O_5$; lithium complex oxides having a main body of a compound expressed by a chemical formula of $Li_dM6O_2$ (M6 represents one or more transition metals, and d varies according to charge and discharge states of the battery and is generally in the range of $0.05 \leq d \leq 1.10$); and particular polymers can be cited. The cathode active material can be used singly, or two or more thereof can be used by mixing.

Specially, a lithium complex oxide including at least one from the group consisting of cobalt (Co), nickel, and manganese (Mn) as the transition metal M6 in the chemical formula of $Li_dM6O_2$ is preferable. Specific examples thereof include $LiCoO_2$, $LiNiO_2$, $Li_eNi_fCo_{1-f}O_2$ (e and f vary according to charge and discharge states of the battery, and are generally in the range of $0<e<1$ and $0.7<f<1.02$), and lithium manganese complex oxides having a spinel type structure. By using such lithium complex oxides, a high voltage and a high energy density can be obtained.

The separator 32 is constructed from, for example, a porous film made of a synthetic resin such as polytetrafluoro ethylene, polypropylene, and polyethylene, or a porous film made of ceramics. The separator 32 can have a structure, in which two or more of the foregoing porous films are layered.

An electrolytic solution, a liquid electrolyte is impregnated in the separator 32. This electrolytic solution includes, for example, a nonaqueous solvent such as an organic solvent and an electrolyte salt dissolved in this nonaqueous solvent. The electrolytic solution can include various additives if necessary. As a nonaqueous solvent, for example, propylene carbonate, ethylene carbonate, vinylene carbonate, diethyl carbonate, dimethyl carbonate, 1,2-dimethoxy ethane, 1,2-diethoxy ethane, γ-butyrolactone, tetrahydrofuran, 2-methyl tetrahydrofuran, 1,3-dioxolane, 4 methyl 1,3 dioxolane, diethyl ether, sulfolane, methyl sulfolane, acetonitrile, propionitrile, anisole, acetic ester, butyric ester, or ester propionate can be cited. Any of the foregoing can be singly used, or a mixture thereof can be used.

As an electrolyte salt, for example, $LiClO_4$, $LiAsF_6$, $LiPF_6$, $LiBF_4$, $LiB(C_6H_5)_4$, $CH_3SO_3Li$, $CF_3SO_3Li$, $LiCl$, or $LiBr$ can be used. Any of the foregoing can be singly used, or a mixture thereof can be used.

Instead of the electrolytic solution, a solid electrolyte, in which an electrolyte salt is contained, or a gelatinous electrolyte, in which a nonaqueous solvent and an electrolyte salt are impregnated in a holding body of a high molecular weight compound can be used.

As a solid electrolyte, any of inorganic solid electrolytes and high molecular weight solid electrolytes can be used, as long as the solid electrolyte is a material having lithium ion conductivity. As an inorganic solid electrolyte, for example, lithium nitride or lithium iodide is used. The high molecular weight solid electrolyte is constructed from a high molecular weight compound containing the foregoing electrolyte salt. An ether high molecular weight compound such as poly(ethylene oxide) and a cross-linking body of poly(ethylene oxide), a poly(methacrylate)esters, or an acrylates can be used singly, or used by being copolymerized or mixed in molecules.

For the holding body in the gelatinous electrolyte, any high molecular weight compound can be used as long as the high molecular weight compound can absorb and gelate a nonaqueous electrolytic solution. For example, a fluorine high molecular weight compound such as poly(vinylidene fluoride) and poly(vinylidene fluoride-co-hexafluoro propylene); an ether high molecular weight compound such as poly(ethylene oxide) and a cross-linking body of poly(ethylene oxide); or poly(acrylic)nitrile is used. In particular, in view of redox stability, the fluorine high molecular weight compound is desirably used. Ion conductivity is given to the gelatinous electrolyte by containing the electrolyte salt in the nonaqueous electrolytic solution.

This secondary battery can be manufactured, for example, as follows.

First, for example, as described above, the anode 10 is fabricated. Next, for example, a cathode active material, and if necessary, a conductive agent and a binder are mixed to prepare a cathode mixture. This cathode mixture is dispersed in a solvent such as N-methyl-2-pyrrolidone to obtain a cathode mixture slurry in paste form. The cathode current collector 31A is coated with this cathode mixture slurry, the solvent is dried, and then the resultant is compression-molded by a roll pressing machine or the like to form the cathode active material layer 31B. In the result, the cathode 31 is fabricated.

Subsequently, the cathode lead 34 is mounted to the cathode current collector 31A by welding or the like, and the anode lead 35 is mounted to the anode current collector 11 by welding or the like. After that, the cathode 31 and the anode 10 are wound with the separator 32 inbetween. An end of the cathode lead 34 is welded to the safety valve mechanism 25, and an end of the anode lead 35 is welded to the battery can 21. The wound cathode 31 and anode 10 are sandwiched between the pair of insulating plates 22 and 23, and housed inside the battery can 21. Next, for example, an electrolyte is injected inside the battery can 21, and the separator 32 is impregnated with the electrolyte. After that, at the open end of the battery can 21, the battery cover 24, the safety valve mechanism 25, and the PTC device 26 are fixed by being caulked through the gasket 27. The secondary battery shown in FIGS. 6 and 7 is thereby formed.

This secondary battery operates as follows.

In this secondary battery, when charged, lithium ions are extracted from the cathode active material layer 31B, and are inserted in the anode active material layer 12 through the electrolyte impregnated in the separator 32. Next, when discharged, lithium ions are extracted from the anode active material layer 12, and are inserted in the cathode active material layer 31B through the electrolyte impregnated in the separator 32. Then, in the anode active material layer 12, the anode active material 12A is largely expanded and shrunk due to charge and discharge. However, the particulate binder 12B functions as a cushion to absorb expansion and shrinkage of the anode active material 12A. In addition, differently from fragile binding due to dissolution and deposition, the binder 12B rigidly binds the anode active material 12A by, for example, being fused. Therefore, cracks or separation of the anode active material layer 12 due to expansion and shrinkage of the anode active material 12A is inhibited, and lowering of the electron conductivity caused by the cracks or the separation can be prevented. Further, since the anode active material 12A is not covered with the binder 12B, electrode reaction can be successfully performed.

As above, according to this embodiment, the anode active material layer 12 includes the particulate binder 12B. Therefore, even when the anode active material 12A is largely expanded and shrunk due to charge and discharge, the binder 12B functions as a cushion to absorb expansion and shrinkage of the anode active material 12A. In addition, differently from fragile binding due to dissolution and deposition, the binder 12B can rigidly bind the anode active material 12A by, for example, being fused or the like. Therefore, even when the simple substance of the element capable of forming an alloy with lithium or the compound thereof is used as the anode active material 12A, cracks or separation of the anode active material layer 12 due to expansion and shrinkage of the anode active material 12A is inhibited, and lowering of the electron conductivity caused by the cracks or the separation can be prevented. Further, since the anode active material 12A is not covered with the binder 12B, electrode reaction can be well performed. Therefore, good initial charge and discharge efficiency (coulomb efficiency) and high capacity characteristics can be obtained, and charge and discharge cycle characteristics can be improved.

In particular, when the anode active material layer 12 is formed by using the dispersion medium having a swelling degree of 10% or less to the binder 12B, the binder 12B is not dissolved in the dispersion medium and remains particulate. Therefore, the anode 10 and the secondary battery according to the embodiment can be easily obtained.

Further, when the binder 12B is fused by heating, the binding force can be improved, and higher effects can be obtained.

Further, detailed descriptions will be given of specific examples of the invention with reference to the drawings.

Examples 1-1 and 1-2

Figure 8:
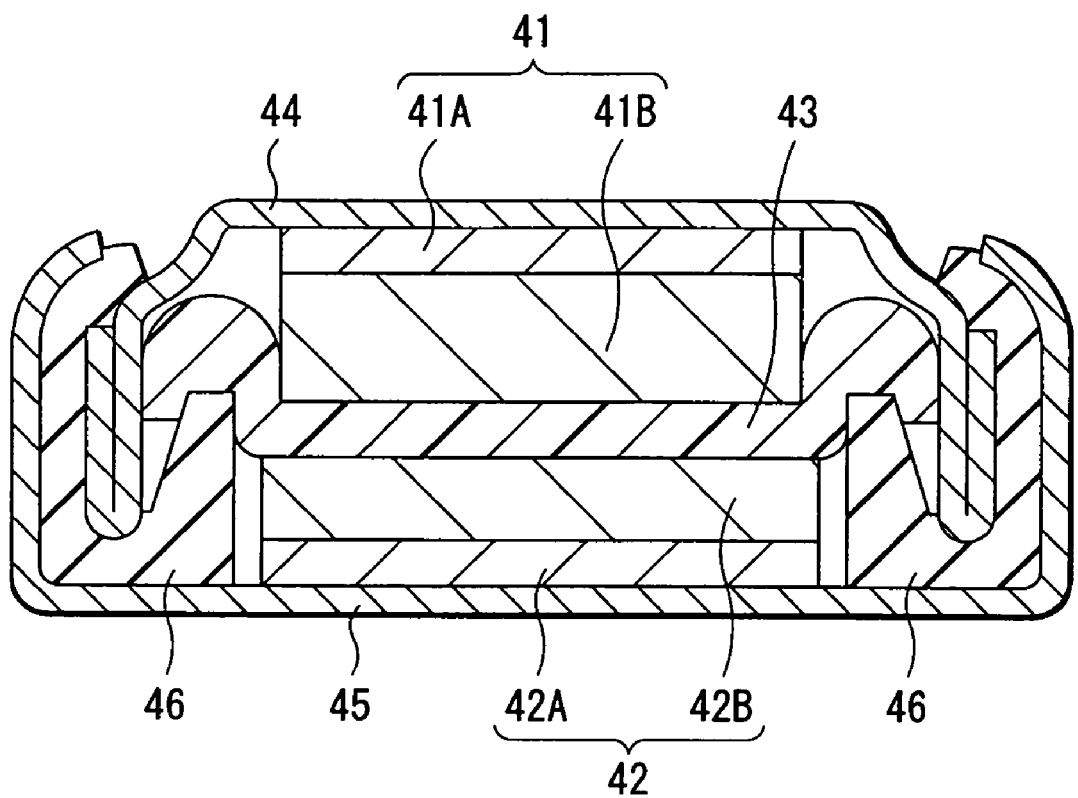
FIG. 8 is a cross section showing a construction of a secondary battery fabricated in examples of the invention.

So-called coin type secondary batteries shown in FIG. 8 were fabricated. In the secondary battery, an anode 41 and a cathode 42 were layered with a separator 43 inbetween, and then the layered body was hermetically sealed inside an exterior cup 44 and an exterior can 45 through gaskets 46.

First, 40 parts by mass of iron and 60 parts by mass of tin were fused, and powders of iron-tin alloy (Fe—Sn alloy) were synthesized by gas atomization method to obtain an anode active material. Next, 70 parts by mass of the Fe—Sn alloy powders, 20 parts by mass of artificial graphite and 2 parts by mass of carbon black as conductive agents, 6 parts by mass of polyvinylidene fluoride showing characteristics that the average particle diameter was 1 μm and the melting point was 170° C. as a binder, and 2 parts by mass of carboxymethyl cellulose as a thickening agent were measured, mixed by a planetary mixer by using a dispersion medium to prepare an anode mixture slurry. Then, in Example 1-1, pure water having a swelling degree of 0% to the binder was used as a dispersion medium. In Example 1-2, methyl isobutyl ketone having a swelling degree of 8.1% to the binder was used as a dispersion medium.

Subsequently, an anode current collector 41A made of a copper foil was coated with this anode mixture slurry, dried, and then compression-molded by a roll pressing machine. Further, the resultant was provided with heat treatment for 2 hours at 200° C. in the vacuum atmosphere to fuse the binder to form an anode active material layer 41B. Consequently, the anode 41 was fabricated. After that, the resultant was punched out into a pellet having a diameter of 15.5 mm. When the anode active material layer 41B of the fabricated anode 41 was observed by a microscope, as shown in FIG. 2, the particulate binder was shown.

Further, lithium carbonate ($Li_2CO_3$) and cobalt carbonate ($CoCO_3$) were mixed at a mole ratio of $Li_2CO_3:CoCO_3=0.5:1$, the mixture was fired for 5 hours at 900° C. in the air to synthesize lithium cobalt complex oxide ($LiCoO_2$) to obtain a cathode active material. Next, 91 parts by mass of this lithium cobalt complex oxide, 6 parts by mass of graphite as a conductive material, and 3 parts by mass of polyvinylidene fluoride as a binder were mixed to prepare a cathode mixture slurry. Then, N-methyl-2-pyrrolidone was added as a dispersion medium to this cathode mixture to obtain a cathode mixture slurry. Subsequently, a cathode current collector 42A made of an aluminum foil was coated with this cathode mixture slurry, dried, and then compression-molded by a roll pressing machine to form a cathode active material layer 42B. Consequently, the cathode 42 was fabricated. After that, the resultant was punched out into a pellet having a diameter of 15.5 mm.

Next, the fabricated anode 41 and the cathode 42 were layered with the separator 43 made of a micro-porous polypropylene film being 25 μm thick inbetween. After that, the layered body was housed inside the exterior can 45, an electrolytic solution was injected, and the exterior cup 44 was caulked through the gaskets 46. Then, the electrolytic solution, in which 1.0 mol/l of $LiPF_6$ as lithium salt was dissolved in a mixed solvent of 50 vol % of ethylene carbonate and 50 vol % of diethyl carbonate was used. Thereby, the secondary batteries shown in FIG. 8 were obtained for Examples 1-1 and 1-2, respectively.

Further, as Comparative example 1-1 to these Examples, a secondary battery was fabricated as in Examples 1-1 and 1-2, except that as a dispersion medium of the anode mixture slurry, N-methyl-2-pyrrolidone having a swelling degree over 10% to the binder was used. The binder, polyvinylidene fluoride is well dissolved in the dispersion medium, N-methyl-2-pyrrolidone, and the swelling degree of N-methyl-2-pyrrolidone to polyvinylidene fluoride is approximately infinite. An anode active material layer of Comparative example 1-1 was also observed by a microscope. In the result, as shown in FIG. 4, the linearly or scariously deposited binder was shown.

Regarding the obtained secondary batteries of Examples 1-1, 1-2 and Comparative example 1-1, a charge and discharge test was performed, and the respective discharge capacities, charge and discharge efficiency, and cycle retention ratios were obtained. Then, regarding charge, after 1 mA constant current charge was performed at 20° C. up to 4.2 V, constant voltage charge was performed at 4.2 V for four hours. Regarding discharge, 1 mA constant current discharge was performed up to 2.5 V final voltage. The discharge capacity was obtained as a relative value in the case that a value of Example 1-1 was set to 100 with respect to a discharge capacity at the first cycle. The charge and discharge efficiency was obtained by a ratio of a discharge amount in relation to a charge amount at the first cycle. Further, the cycle retention ratio was obtained by a ratio of a discharge capacity at the 100th cycle when 100 cycle charge and discharge was performed under the foregoing conditions and a discharge capacity at the first cycle was set to 100. The results are shown in Table 1.

As evidenced by Table 1, according to Examples 1-1 and 1-2, all the discharge capacity, the charge and discharge efficiency, and the cycle retention ratio could be significantly improved compared to in Comparative example 1-1. That is, it was found that when the dispersion medium having a swelling degree of 10% or less to the binder was used, good charge and discharge efficiency and a high discharge capacity could be obtained and charge and discharge cycle characteristics could be improved, even if the compound of the element capable of forming an alloy with lithium was used as an anode active material.

Examples 1-3 to 1-8

Secondary batteries were fabricated as in Examples 1-1, except that heat treatment conditions in fusing the binder were changed as shown in Table 2. That is, in Example 1-3, heat treatment was performed after drying and before compression molding. In Example 1-4, heat treatment was performed in the argon gas atmosphere. In Example 1-5, heat treatment time was set to 10 minutes. In Example 1-6, heat treatment temperature was set to 180° C. In Example 1-7, heat treatment temperature was set to 160° C. In Example 1-8, heat treatment temperature was set to 140° C.

Regarding the obtained secondary batteries of Examples 1-3 to 1-8, the respective discharge capacities, charge and discharge efficiency, and cycle retention ratios were obtained. Results thereof are shown in Table 2 together with the results of Example 1-1 and Comparative example 1-1. Further, regarding Examples 1-1, 1-3 to 1-8, and Comparative example 1-1, a peel test, in which an adhesive tape was adhered to the anode 41, and the anode current collector 41A and the anode active material layer 41B were pulled in the 180-degree opposite directions was performed to examine peel strengths. Results thereof are shown in Table 2 as well. The peel strengths shown in Table 2 are relative values when the value of Comparative example 1-1 is set to 100.

As evidenced by Table 2, according to Examples 1-3 to 1-8, similarly to in Example 1-1, all the discharge capacity, the charge and discharge efficiency, and the cycle retention ratio could be significantly improved compared to in Comparative example 1-1. Further, according to Examples 1-1 and 1-3 to 1-6, in which heat treatment was performed at temperatures equal to or more than the melting point of the binder, the peel strength could be significantly improved compared to in Examples 1-7 and 1-8, in which heat treatment was performed at temperatures equal to or less than the melting point of the binder.

That is, it was found that when the dispersion medium having a swelling degree of 10% or less to the binder was used, the discharge capacity, the charge and discharge efficiency, and the charge and discharge cycle characteristics could be improved, regardless whether the binder was fused by heat treatment or not. Further, it was also found that when the binder was fused by heat treatment, the peel strength could be improved. Furthermore, it was found that these characteristics were not been significantly affected by heat treatment conditions such as processes, atmospheres, temperatures, and time.

Example 1-9

A secondary battery was fabricated as in Examples 1-1, except that when the anode mixture slurry was fabricated, the binder was dispersed in pure water, the dispersion medium, in which polyoxy ethylene (10) octyl phenyl ether was previously added as a dispersion aid, and then the anode active material, the conductive agent, and the binder were added and dispersed. Regarding the obtained secondary battery of Example 1-9, the discharge capacity, the charge and discharge efficiency, and the cycle retention ratio were obtained as in Example 1-1. Results thereof are shown in Table 3 together with the results of Example 1-1.

As evidenced by Table 3, according to Example 1-9, in which the binder was previously dispersed by using the dispersion aid, all the discharge capacity, the charge and discharge efficiency, and the cycle retention ratio could be improved more than in Example 1-1. That is, it was found that by improving dispersion characteristics of the binder, higher effects could be obtained.

Examples 1-10 and 1-11

Secondary batteries were fabricated as in Examples 1-1, except that an average particle diameter of the binder was set to 30 μm and 50 μm in Examples 1-10 and 1-11, respectively. Regarding the obtained secondary batteries of Examples 1-10 and 1-11, the respective discharge capacities, charge and discharge efficiency, and cycle retention ratios were obtained as in Example 1-1. Results thereof are shown in Table 4 together with the results of Example 1-1 and Comparative example 1-1.

As evidenced by Table 4, according to Example 1-10, in which the average particle diameter of the binder was smaller, even more, according to Example 1-1, better values were obtained for all the discharge capacity, the charge and discharge efficiency, and the cycle retention ratio. Further, in Example 1-11, in which the average particle diameter of the binder was 50 µm, though the cycle retention ratio could be improved more than in Comparative example 1-1, the results of the discharge capacity and the charge and discharge efficiency were poor. It is thinkable that the reason thereof was that when the average particle diameter of the binder was large, dispersion characteristics were lowered, and the electrode was hard to be formed. That is, it was found that the average particle diameter of the binder was preferably 30 µm or less, and more preferably 1 µm or less.

Examples 1-12 to 1-14

Secondary batteries of Examples 1-12 and 1-13 were fabricated as in Examples 1-1, except that cobalt-tin alloy (Co—Sn alloy) powders were used in Example 1-12, and copper-silicon alloy (Cu—Si alloy) powders were used in Example 1-13 as an anode active material. Then, in Example 1-12, 40 parts by mass of cobalt and 60 parts by mass of tin were fused, and Co—Sn alloy powders were synthesized by gas atomization method. In Example 1-13, 50 parts by mass of copper and 50 parts by mass of silicon were fused, and Cu—Si alloy powders were synthesized by gas atomization method.

Further, in Example 1-14, a secondary battery was fabricated as in Example 1-1, except that a composition of the anode mixture slurry was 77 parts by mass of the anode active material, 15 parts by mass of artificial graphite, 2 parts by mass of carbon black, 4 parts by mass of the binder, and 2 parts by mass of the thickening agent. That is, in Example 1-14, a ratio of the anode active material was increased.

Regarding the obtained secondary batteries of Examples 1-12 to 1-14, the respective discharge capacities, charge and discharge efficiency, and cycle retention ratios were obtained as in Example 1-1. Results thereof are shown in Table 5 together with the results of Example 1-1 and Comparative example 1-1.

As evidenced by Table 5, according to Examples 1-12 to 1-14, similarly to in Example 1-1, all the discharge capacity, the charge and discharge efficiency, and the cycle retention ratio could be significantly improved compared to in Comparative example 1-1. That is, it was found that even when other material was used as an anode active material, similar effects could be obtained. Further, it was found that even when the ratios of the anode active material, the binder and the like in the anode mixture slurry were changed, similar effects could be obtained.

Example 2-1

The cylinder winding type secondary battery shown in FIGS. 6 and 7 was fabricated. Then, the same anode 10, the same cathode 31, the same separator 32, and the same electrolytic solution as those in Example 1-1 were used. Regarding the fabricated secondary battery of Example 2-1, the discharge capacity, the charge and discharge efficiency, and the cycle retention ratio were obtained respectively as in Example 1-1. Results thereof are shown in Table 6 together with the results of Example 1-1 and Comparative example 1-1. The discharge capacity of Example 2-1 is a relative value in relation to of Example 1-1, which is converted to a value per unit mass of the cathode 31.

As evidenced by Table 6, according to Example 2-1, similarly to in Example 1-1, all the discharge capacity, the charge and discharge efficiency, and the cycle retention ratio could be significantly improved compared to in Comparative example 1-1. That is, it was found that similar effects could be obtained with respect to the winding secondary battery as well.

In the foregoing examples, the case using polyvinylidene fluoride as a binder has been described. However, in the case using a copolymer including vinylidene fluoride as a binder, totally similar results can be also obtained. Further, in the foregoing examples, the anode active material, the dispersion medium and the like have been described with reference to the several examples. However, as long as the dispersion medium having a swelling degree of 10% or less to the binder is used, totally similar results can be obtained.

While the invention has been described with reference to the embodiment and examples, the invention is not limited to the foregoing embodiment and examples, and various modifications may be made. For example, in the foregoing embodiment and examples, the cylinder type secondary battery having the winding structure, or the coin type secondary battery have been described. However, the invention can be similarly applied to an oval type or a polygonal type secondary battery having a winding structure, or a secondary battery having a structure, in which a cathode and an anode are folded or stacked. Further, the invention can be applied to secondary batteries of card type, flat type, button type, square type and the like. Further the invention can be also applied to a secondary battery using a film exterior member such as a laminated film. In addition, the invention can be applied not only to the secondary battery, but also to a primary battery.

In the foregoing embodiment and examples, the secondary battery using lithium as an electrode reaction species has been described. However, in the case using other alkali metal such as sodium (Na) and potassium (K); an alkali earth metal such as magnesium and calcium (Ca); other light metal such as aluminum; or an alloy of lithium or the foregoing metals, the invention can be applied and similar effects can be obtained. Then, the anode active material, the cathode active material, the nonaqueous solvent, the electrolyte salt and the like can be selected according to the light metal.

As described above, according to the anode or the battery of the invention, the anode includes the particulate binder. Therefore, even when the anode active material is largely expanded and shrunk due to charge and discharge, the binder functions as a cushion to absorb expansion and shrinkage of the anode active material, and lowering electron conductivity caused by generation of cracks or separation can be prevented. Further, the anode active material is prevented from being covered with the binder, and electrode reaction can be successfully performed. Therefore, good initial charge and discharge efficiency and high capacity characteristics can be obtained, and charge and discharge cycle characteristics can be improved.

In particular, in the anode or the battery of the invention, by setting the average particle diameter of the binder to 30 µm or less, the binder can be uniformly dispersed, and higher effects can be obtained. Further, by fusing the binder by heating, the binding force can be improved, and higher effects can be obtained.

Further, in the method of manufacturing an anode or the method of manufacturing a battery of the invention, the anode is formed by using the dispersion medium having a swelling degree of 10% or less to the binder. Therefore, the binder is not dissolved in the dispersion medium and remains particulate. In the result, the anode and the battery of the invention can be easily obtained. In addition, when the anode mixture slurry, in which the binder is dispersed in the dispersion medium, and then the anode active material is dispersed is used, dispersion characteristics of the binder can be improved, and higher effects can be obtained.

TABLE 1

| | Dispersion medium | | Discharge capacity (relative value) | Charge and discharge efficiency (%) | Cycle retention ratio (%) |
| --- | --- | --- | --- | --- | --- |
| | Kind | Swelling degree to binder (%) | | | |
| Example 1-1 | Pure water | 0 | 100 | 82 | 86 |
| Example 1-2 | Methyl isobutyl ketone | 8.1 | 80 | 77 | 70 |
| Comparative example 1-1 | N-methyl-2-pyrrolidone | Over 10 (approx infinite) | 75 | 69 | 68 |

TABLE 2

| | Heat treatment conditions | Discharge capacity (relative value) | Charge and discharge efficiency (%) | Cycle retention ratio (%) | Peel strength |
| --- | --- | --- | --- | --- | --- |
| Example 1-1 | After compression molding, in vacuum, 200° C., 2 hr | 100 | 82 | 86 | 199 |
| Example 1-3 | Before compression molding, in vacuum, 200° C., 2 hr | 100 | 82 | 86 | 198 |
| Example 1-4 | After compression molding, in Ar, 200° C., 2 hr | 99 | 83 | 85 | 199 |
| Example 1-5 | After compression molding, in vacuum, 200° C., 10 min | 99 | 81 | 85 | 195 |
| Example 1-6 | After compression molding, in vacuum, 180° C., 2 hr | 99 | 82 | 86 | 160 |
| Example 1-7 | After compression molding, in vacuum, 160° C., 2 hr | 92 | 81 | 85 | 105 |
| Example 1-8 | After compression molding, in vacuum, 140° C., 2 hr | 90 | 80 | 84 | 102 |
| Comparative example 1-1 | After compression molding, in vacuum, 200° C., 2 hr | 75 | 69 | 68 | 100 |

TABLE 3

| | Anode mixture slurry | Discharge capacity (relative value) | Charge and discharge efficiency (%) | Cycle retention ratio (%) |
| --- | --- | --- | --- | --- |
| Example 1-1 | Simultaneous mixture in dispersion medium | 100 | 82 | 86 |
| Example 1-9 | Previously mixing binder by using dispersion aid | 105 | 85 | 89 |

TABLE 4

| | Average particle diameter of binder (μm) | Discharge capacity (relative value) | Charge and discharge efficiency (%) | Cycle retention ratio (%) |
| --- | --- | --- | --- | --- |
| Example 1-1 | 1 | 100 | 82 | 86 |
| Example 1-10 | 30 | 80 | 72 | 80 |
| Example 1-11 | 50 | 70 | 68 | 73 |
| Comparative example 1-1 | 1 | 75 | 69 | 68 |

TABLE 5

|  | Anode active material | Discharge capacity (relative value) | Charge and discharge efficiency (%) | Cycle retention ratio (%) |
| --- | --- | --- | --- | --- |
| Example 1-1 | Fe—Sn alloy | 100 | 82 | 86 |
| Example 1-12 | Co—Sn alloy | 105 | 80 | 84 |
| Example 1-13 | Cu—Si alloy | 110 | 79 | 82 |
| Example 1-14* | Fe—Sn alloy | 110 | 78 | 80 |
| Comparative example 1-1 | Fe—Sn alloy | 75 | 69 | 68 |

*In Example 14, a ratio of the anode active material was improved.

TABLE 6

|  | Discharge capacity (relative value) | Charge and discharge efficiency (%) | Cycle retention ratio (%) |
| --- | --- | --- | --- |
| Example 1-1 | 100 | 82 | 86 |
| Example 2-1 | 103* | 83 | 85 |
| Comparative example 1-1 | 75 | 69 | 68 |

*Value per unit mass of the cathode

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An anode, comprising:
a particulate anode active material;
a conductive agent, and
a particulate binder containing at least one compound selected from the group consisting of copolymers including vinylidene fluoride and polyvinylidene fluoride,
wherein the binder is not dissolved in a dispersion medium and is fused by heating such that the anode active material and the conductive agent are prevented from being covered with the binder.

2. An anode according to claim 1, wherein an average particle diameter of the binder ranges from about 30 μm or less.

3. An anode according to claim 1, wherein the anode active material includes at least one substituent selected from the group consisting of one or more simple substances of elements capable of forming an alloy with lithium and compounds thereof.

4. An anode according to claim 1, which is formed by using an anode mixture slurry that includes: the anode active material; the binder; and a dispersion medium having a swelling degree of about 10% or less to the binder.

5. An anode according to claim 4, which is formed by using an anode mixture slurry, wherein at least the binder is dispersed in the dispersion medium, and then the anode active material is dispersed.

6. An anode according to claim 4, which is formed by using an anode mixture slurry, wherein an average particle diameter of the binder is about 30 μm or less.

7. The anode of claim 1, wherein the binder is fused by heating to at least about the melting point of the binder.

8. The anode of claim 1, wherein the binder is fused by heating to at least about 180° C.

9. The anode of claim 1, wherein the binder is fused by heating to at least about 200° C.

* * * * *